US005437913A

United States Patent [19]

Asaka et al.

[11] Patent Number: 5,437,913

[45] Date of Patent: Aug. 1, 1995

[54] ELECTROPHOTOGRAPHIC TRANSFER FILM

[75] Inventors: Kazuo Asaka; Katsumi Harada, both of Ebina; Takashi Kobayashi; Yoshio Tani, both of Fujinomiya, all of Japan

[73] Assignee: Fuji Xerox Co., Ltd., Tokyo, Japan

[21] Appl. No.: 228,936

[22] Filed: Apr. 14, 1994

[30] Foreign Application Priority Data

Apr. 16, 1993 [JP] Japan .................................. 5-113723
Jul. 8, 1993 [JP] Japan .................................. 5-193159

[51] Int. Cl.$^6$ .................................................. B32B 3/00

[52] U.S. Cl. .................................... 428/195; 428/208; 428/414; 428/480; 428/483; 428/500; 428/688

[58] Field of Search ............... 428/143, 195, 212, 208, 428/414, 480, 483, 500, 688; 430/14, 162; 252/518

[56] References Cited

U.S. PATENT DOCUMENTS

| | | | |
|---|---|---|---|
| 4,416,963 | 11/1983 | Takimoto et al. | 430/69 |
| 4,994,342 | 2/1991 | Nakayama et al. | 430/49 |
| 5,057,389 | 10/1991 | Nakayama et al. | 430/49 |
| 5,171,480 | 12/1992 | Yoshinaka et al. | 252/518 |
| 5,312,671 | 5/1994 | Atherton et al. | 428/143 |

FOREIGN PATENT DOCUMENTS

| | | |
|---|---|---|
| 48-75240 | 10/1973 | Japan . |
| 50-81339 | 7/1975 | Japan . |
| 51-25140 | 3/1976 | Japan . |
| 51-34734 | 9/1976 | Japan . |
| 55-9524 | 1/1980 | Japan . |
| 55-33134 | 3/1980 | Japan . |
| 56-38052 | 4/1981 | Japan . |
| 56-143443 | 11/1981 | Japan . |
| 57-53592 | 11/1982 | Japan . |
| 58-27494 | 6/1983 | Japan . |
| 58-28574 | 6/1983 | Japan . |
| 59-42864 | 10/1984 | Japan . |
| 61-151542 | 7/1986 | Japan . |
| 61-259261 | 11/1986 | Japan . |
| 62-238526 | 10/1987 | Japan . |
| 1-315768 | 12/1989 | Japan . |

*Primary Examiner*—Patrick J. Ryan
*Assistant Examiner*—William A. Krynski
*Attorney, Agent, or Firm*—Oliff & Berridge

[57] ABSTRACT

An electrophotographic transfer film comprising a transparent substrate having formed on at least one side thereof an image-receiving layer is disclosed, in which the image-receiving layer comprises a binder resin and at least one resistivity control agent selected from (a) conductive metal oxide fine particles having an average particle size of not greater than 0.1 $\mu$m and (b) an non-ionic surface active agent, and the image-receiving layer has a surface resistivity of from $1\times10^9$ to $1\times10^{13}$ $\Omega$ at 25° C. and 65% RH. The electrophotographic transfer film is less liable to variation of surface resistivity with environmental changes, particularly a great change in humidity, and exhibits excellent transfer properties to provide a toner image of high density in a stable manner.

17 Claims, 1 Drawing Sheet

ELECTROPHOTOGRAPHIC TRANSFER FILM

FIELD OF THE INVENTION

This invention relates to a transparent transfer film suitable for forming a transparent image, called a transparency, by means of an electrophotographic copying machine for ordinary paper. More particularly, it relates to an electrophotographic transfer film applicable to an overhead projector (hereinafter abbreviated as OHP).

BACKGROUND OF THE INVENTION

Electrophotographic image formation generally consists of charging a surface of an electrophotographic photoreceptor, imagewise exposing the photoreceptor to light to form an electrostatic latent image, visualizing the latent image with a toner (development), transferring the toner image to transfer paper, and fixing the toner image by heat or pressure. This process using transfer paper (ordinary paper) is called indirect electrophotography and adopted in general electrophotographic copying machines using ordinary paper as a transfer material. There is another image formation process, called direct electrophotography, in which paper itself serves as a photoreceptor. In direct electrophotography, a latent image is formed directly on paper having a photosensitive layer (ZnO-coated paper), the latent image is developed with a toner, and the toner image is fixed on the paper.

Where an electrophotographic copying machine using ordinary paper as a transfer material according to indirect electrophotography is used for formation of a transparency on a transparent film (electrophotographic transfer film) in place of ordinary paper, various problems arise: for example, miss-feeding of films (e.g., feed of two or more films from a paper feeder at a time, hereinafter referred to as double feeding), haze, abrasion in handling, insufficient adhesion of toner, and emboss marks by a heating roll.

In general, fixing of a toner image on a transfer material inclusive of a transparent film is carried out by heat fixing by means of a heat roll or pressure fixing by means of a roller. Pressure fixing is attracting attention with expectation of size reduction of a copying machine and energy saving but has not yet come into general use on account of the failure in reaching the levels of fixing properties attained by heat fixing.

Heat fixing, which has conventionally been used, still involves problems waiting for solutions when applied to a toner image on a transparent film. For example, toner fixing properties on a transparent image-receiving layer, in terms of transfer and adhesion, are unsatisfactory as compared with those obtained by fixing on paper. Additionally, the image-receiving layer tends to be softened or melted by the heat of fixing to suffer uneven emboss marks.

The fixing properties might be improved by reducing the glass transition temperature (Tg) of the binder to be used in the image-receiving layer. However, mere use of a binder having a lower Tg would make the image-receiving layer more liable to softening and melting by the heat for fixing, resulting in development of uneven emboss marks.

In order to improve resistance to embossing and feeding properties of a transparent film, it has been a practice to incorporate a matting agent into an image-receiving layer. For example, an image-receiving layer comprising an acrylic resin, a styrene-acrylate copolymer or a polyester resin as a binder resin having dispersed therein a matting agent, e.g., silica powder, has been proposed as disclosed in JP-A-50-81339 (the term "JP-A" as used herein means an "unexamined published Japanese patent application"), JP-A-1-315768 and JP-B-57-53592 (the term "JP-B" as used herein means an "examined published Japanese patent application"). These binder resins disclosed generally have a Tg of 60° C. or higher. However, such image-receiving layers are not recognized to have sufficient toner fixing properties in terms of toner adhesion.

In an attempt to improve fixing properties (toner adhesion) and resistance to embossing, JP-A-61-259261 proposes to provide on a transparent substrate a coating layer comprising a potassium alkyl phosphate composed of $ROPO_3K_2$ and $(RO)_2PO_2K$ (wherein R is an alkyl group having from 6 to 14 carbon atoms) and a cellulose resin; and JP-A-48-75240 teaches to combine a polymer and a matting agent with an antistatic agent, such as a naphthalenesulfonate, a sulfocarboxylic acid ester or a phosphoric ester. While incorporation of such an anionic surface active agent into an image-receiving layer brings about improvements in fixing properties, transfer properties and resistance to embossing, the surface active agent bleeds on the surface of the image-receiving layer with time, failing to maintain satisfactory toner transfer properties and adhesion to a toner.

On the other hand, it is known that toner transfer properties and film feeding properties are improved by providing a layer having controlled surface resistivity on a transparent plastic film. For example, JP-B-51-34734 discloses a plastic film having thereon a layer of an organic solvent-soluble resin containing a matting agent (inorganic fine particles or plastic powder) so as to have a surface resistivity controlled at $1\times10^9$ to $1\times10^{15}\ \Omega$. This resin layer exhibits somewhat improved toner transfer properties under a normal humidity condition. However, the resistivity increases under a low humidity condition on account of the organic solvent-soluble resin, tending to cause double feeding and, on the contrary, decreases under a high humidity condition, resulting in reduction in toner transfer properties. That is, resistivity control cannot be done sufficiently in using an organic solvent-soluble resin and requires assistance of a surface active agent or any other means.

JP-B-59-42864 discloses a film comprising a substrate having provided thereon two layers: a subbing layer of an anionic or cationic conductive resin and an image-receiving layer of an acrylic resin in this order, and JP-A-62-238526 discloses a film comprising a substrate having thereon a subbing layer containing an organic salt for imparting conductivity and an image-receiving layer of polymethyl methacrylate. A subbing layer comprising an ion conducting substance as taught above is effective to reduce the surface resistivity of the film surface. However, the surface resistivity is dependent on the water absorption of the subbing layer and is liable to large variation with changes in humidity. In particular, the resistivity is reduced under a high humidity condition to cause reduction in toner transfer properties.

In the field of direct electrostatic recording consisting of charging a recording material by applying high voltage with a recording stylus, developing the electrostatic latent image with a toner, and fixing the toner image (direct electrophotography), various recording materials containing fine particles of a metal oxide have been proposed to date. For example, a recording material comprising a paper substrate having provided thereon a conductive layer comprising a binder having dispersed therein metal oxide fine particles and further provided thereon a layer of an organic solvent-soluble resin containing calcium carbonate particles has been proposed, as described in JP-A-51-25140, JP-B-58-27494, JP-B-58-28574, JP-A-55-9524, JP-A-55-33134, and JP-A-56-38052. Application of the same technique to a transparent plastic film substrate in place of the paper substrate is also known. For instance, JP-A-61-151542 shows an electrostatic recording material comprising a transparent plastic film having provided thereon a conductive layer comprising antimony-doped stannic oxide particles having an average particle size of not more than 0.1 μm and a binder (a water-soluble resin or an emulsion) and further provided thereon a dielectric layer.

Further, JP-A-56-143443 teaches an electrophotographic film for direct electrophotography as above noted, in which a conductive subbing layer comprising stannic oxide particles having an average particle size of not more than 0.5 μm and a binder (a water-soluble resin) provided on a plastic film substrate.

The above-mentioned conductive layer containing metal oxide fine particles copes with change of environmental humidity and is expected to be applicable to a film for indirect electrophotography. However, so far as the aforesaid layer structure is followed, it is necessary to form a conductive layer containing metal oxide fine particles on a substrate and then an image-receiving layer containing a matting agent thereon. That is, two layers should be provided on a transparent substrate similarly to the above-described layer structure comprising an ion-conducting subbing layer and an image-receiving layer, which is very disadvantageous for productivity.

Further, the idea of the above-illustrated electrostatic recording materials for direct electrophotography does not apply as such to electrophotographic films for indirect electrophotography because the former should have far lower surface resistivity than the latter so that a latent image may be formed directly on the recording material. Neither does apply the construction of the above-mentioned conductive layer for direct electrophotography. That is, the films for indirect electrophotography are required to have satisfactory receptivity of the toner from a photoreceptor, i.e., toner transfer properties. In addition, since a large number of copies are usually taken by indirect electrophotography because of ease of copying operation, the films therefor are required to have excellent feeding properties. Other various problems as above stated are also waiting for solutions as well.

Binder resins for electrophotographic transfer films suitable for heat fixing preferably have a Tg of not less than 60° C. so as to have satisfactory fixing properties and resistance to embossing in heat fixing with a heat roll. A combined use of a matting agent is effective especially for improving resistance to embossing. Nevertheless, it turned out that a combination of such a binder resin and a matting agent does not suffice to satisfy the above-mentioned various requirements, such as fixing properties, particularly when used under widely varying environmental conditions or when stored or used for a long period of time.

SUMMARY OF THE INVENTION

As a result of extensive investigations, the present inventors have found that a combination of a binder resin and a nonionic surface active agent as a resistivity control agent will provide a toner image-receiving layer having sufficient and stable toner fixing properties even with environmental changes particularly in humidity or even when the film is stored or used for a long period of time. The use of a nonionic surface active agent makes it possible to stabilize the surface resistivity of an electrophotographic transfer film against environmental changes, particularly a great change in humidity. That is, the resulting electrophotographic transfer film exhibits its excellent transfer properties on copying to provide an image of high density; an increase of the surface resistivity in a low humidity environment is minimized, hardly causing frictional charging during processing or handling; and the film exhibits excellent fixing properties (toner adhesion).

Where the image-receiving layer contains a binder resin having a Tg of not less than 60° C. or a matting agent, the resulting film has improved resistance to embossing. In particular, use of a matting agent makes the surface of the image-receiving layer uneven to prevent films from sticking together due to frictional electrification, thereby assuring improved film feeding properties.

The present inventors have also conducted study for obtaining an electrophotographic transfer film comprising a transparent substrate having thereon only one layer as an image-receiving layer and yet exhibiting satisfactory properties, including scratch resistance, without separately providing a subbing layer or a conductive layer.

Where metal oxide fine particles are incorporated into a toner image-receiving layer in an attempt to obtain stable surface resistivity, the confronting problem is that addition of metal oxide fine particles to an image-receiving layer, while facilitating surface resistivity control, results in formation of large projections on the layer surface, which leads to insufficient toner adhesion, considerable haze, or reduced scratch resistance during film feed. As a result of study, the inventors have found that this problem can be solved by using, as a resistivity control agent, conductive metal oxide fine particles having an average particle size of not greater than 0.1 μm.

Accordingly, an object of the present invention is to provide an electrophotographic transfer film having improved toner fixing properties and resistance to embossing.

Another object of the present invention is to provide an electrophotographic transfer film having improved toner fixing properties, resistance to embossing, toner transfer properties, and film feeding properties.

A further object of the present invention is to provide an electrophotographic transfer film suitable for formation of a transparency by means of an electrophotographic copying machine for ordinary paper in which a heat roll is used in the toner image fixing part.

A still further object of the present invention is to provide an electrophotographic transfer film which has stable surface resistivity even with environmental changes, particularly a large change in humidity, which exhibits excellent transfer properties on copying to provide a high density toner image, which hardly develops frictional electricity during processing or handling even under a low humidity condition thereby exhibiting excellent feeding properties, and which is also excellent in scratch resistance.

A yet further object of the present invention is to provide an electrophotographic transfer film suitable as an OHP sheet.

The above objects of the present invention are basically accomplished by an electrophotographic transfer film comprising a transparent substrate having formed on at least one side thereof an image-receiving layer containing a binder resin and at least one resistivity control agent selected from (a) conductive metal oxide fine particles having an average particle size of not greater than 0.1 μm and (b) an nonionic surface active agent, the image-receiving layer having a surface resistivity of from $1\times10^9$ to $1\times10^{13}$ Ω at 25° C. and 65% RH.

The electrophotographic transfer film according to the present invention embraces the following preferred embodiments:

1) The electrophotographic transfer film, in which the image-receiving layer further contains a matting agent.
2) The electrophotographic transfer film, in which the nonionic surface active agent is a polyethylene glycol-based nonionic surface active agent having a polyoxyethylene structure.
3) The electrophotographic transfer film, in which the nonionic surface active agent has a hydrophiliclipophilic balance (HLB) of from 11 to 14.
4) The electrophotographic transfer film, in which the nonionic surface active agent is an ethylene oxide adduct of an alkylphenol.
5) The electrophotographic transfer film, in which the binder resin is a resin having a Tg of from 60° to 120° C.
6) The electrophotographic transfer film, in which the binder resin is a polyester resin.
7) The electrophotographic transfer film, in which the binder resin is a polyester resin having a glycidyl group in the molecular structure thereof.
8) The electrophotographic transfer film, in which the binder resin is a water-dispersible polymer.
9) The electrophotographic transfer film according to embodiment (1), in which the matting agent has an average particle size of from 1 to 5 μm.
10) The electrophotographic transfer film according to embodiment (1), in which the matting agent is a resin having a coefficient of static friction of not more than 0.4.
11) The electrophotographic transfer film according to embodiment (1), in which the matting agent is a polyolefin.
12) The electrophotographic transfer film according to embodiment (1), in which the matting agent has an average particle size of from more than 0.1 to not more than 10 μm.
13) The electrophotographic transfer film, in which the film further comprises a conductive subbing layer containing a nonionic surface active agent, provided between the transparent substrate and the image-receiving layer.
14) The electrophotographic transfer film, in which the image-receiving layer has a thickness of from 0.01 to 1 μm.
15) The electrophotographic transfer film, in which the transparent substrate comprises polyethylene terephthalate.
16) The electrophotographic transfer film, in which the metal oxide fine particles are Sb-doped stannous oxide ($SnO_2$) fine particles.

DETAILED DESCRIPTION OF THE INVENTION

Figure 1:
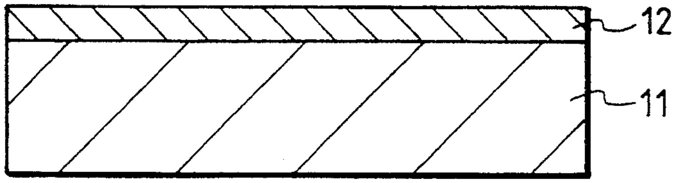
FIGS. 1, 2, and 3 are each a cross section illustrating a layer structure of an electrophotographic transfer film according to the present invention.
Figure 2:
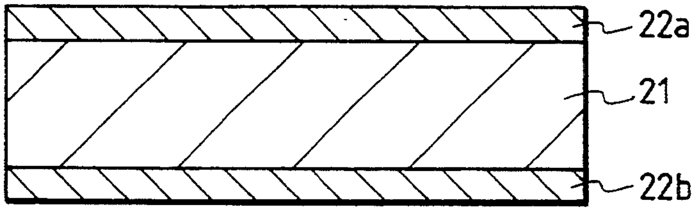
Figure 3:
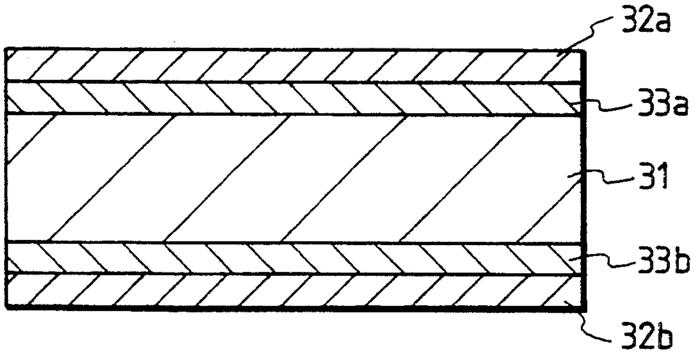

The electrophotographic transfer film of the present invention comprises a transparent substrate and a toner image-receiving layer provided on one or both sides of the substrate as schematically illustrated in FIGS. 1 through 3.

The film shown in FIG. 1 is composed of transparent substrate 11 having on one side thereof image-receiving layer 12. The film shown in FIG. 2 has image-receiving layer *22a* or *22b* on each side of transparent substrate 21. The film shown in FIG. 3 is composed of transparent substrate 31 having on each side thereof conductive subbing layer *33a* or *33b* and image-receiving layer *32a* or *32b* in this order.

Transparent substrate 11, 21 or 31 is made of any resin materials which are transparent and withstand radiant heat when used as an OHP sheet. Suitable resin materials include polyester resins, e.g., polyethylene phthalate; cellulose esters, e.g., nitrocellulose, cellulose acetate, and cellulose acetate butyrate; polysulfone, polyphenylene oxide, polyimide, polycarbonate, and polyamide. Preferred of them is polyethylene phthalate. While not limiting, the transparent substrate preferably has a thickness of from 50 to 200 μm from the standpoint of ease in handling.

Image-receiving layer 12, *22a*, *22b*, *32a* or *32b* is a layer comprising a binder resin and at least one resistivity control agent selected from (a) conductive metal oxide fine particles having an average particle size of not greater than 0.1 μm and (b) a nonionic surface active agent. These image-receiving layers should have a surface resistivity between $1\times10^9$ Ω and $1\times10^{13}$ Ω.

Suitable binder resins which can be used in the image-receiving layer include polyester resins, polyether resins, acrylic resins, epoxy resins, urethane resins, amino resins, and phenolic resins. Preferred of them are polyester resins, particularly those having a glycidyl group in the molecular structure thereof, or resins having a Tg of not lower than 60° C., particularly of from 60° to 120° C., or water-dispersible resins, for the respective reasons hereinafter described. Polyester resins having a glycidyl group seem to contribute to further improvement in toner adhesion. The polyester resins contain preferably 1 to 10% by weight, more preferably 2 to 6% by weight of a glycidyl group in the molecule thereof. The binder resins preferably have a molecular weight of from 2000 to 30000. If the molecular weight is less than 2000, blocking of the films, when piled, tends to occur, and the film strength tends to be reduced. If it exceeds 30000, offset of the toner onto a fixing roll tends to occur. If the binder resin has a Tg of less than 60° C., the image-receiving layer tends to be softened or melted by the heat of a fixing roll, readily suffering uneven marks (emboss marks) which will impair the transparency. If the Tg exceeds 120° C., the toner adhesion tends to be reduced.

The binder resin is preferably used in the form of an aqueous polymer dispersion for formation of an image-receiving layer. In this regard, water-dispersible polymers, such as acrylic resins and polyester resins, are preferred as above mentioned. The water-dispersible polymers preferably contain 0.1 to 10% by weight, more preferably 1 to 5% by weight, of a polar group, such as a quaternary ammonium salt group, a sulfonic group, a sulfonate group, a carboxyl group, a carboxylate group, a phosphoric acid group, or a phosphate group, in the molecule thereof.

The conductive metal oxide fine particles which can be used as a resistivity control agent in the image-receiving layer include fine particles of ZnO, TiO, $TiO_2$, $SnO_2$, $Al_2O_3$, $In_2O_3$, SiO, $SiO_2$, MgO, BaO, or $MoO_3$. These metal oxides may be used either individually or in the form of a compound oxide thereof. The metal oxide preferably contains a different element as a dopant. For example, Al- or In-doped ZnO, Nb- or Ta-doped TiO, and Sb-, Nb- or halogen-doped $SnO_2$ are preferred. Sb-doped $SnO_2$ is particularly preferred for its stable conductivity with time. The dopant atom may be contained in an amount of 1/20 to 1/1, preferably 1/15 to 1/5 per metal atom constituting the metal oxide.

It is preferable to minimize the particle size of the conductive metal oxide particles for maintaining performance properties as an image-receiving layer and for inhibiting light scattering. For use in transparent films the toner image on which is projected, i.e., OHP sheets, the efficiency of light scatter is desirably not more than 20%. To this effect, the average particle size of the conductive metal oxide must be 0.1 μm or smaller, preferably 0.05 μm or smaller.

A mixing ratio of the metal oxide fine particles to the binder resin is preferably from 1:3 to 3:1 by weight.

The image-receiving layer which can be used as a resistivity control agent in the image-receiving layer also contributes to improvement in fixing properties, resistance to embossing, and transfer properties.

The nonionic surface active agents which can be used in the present invention preferably include those having a polyoxyethylene structure, namely, polyethylene glycol-based ones or ethylene oxide-based ones. Suitable nonionic surface active agents having a polyoxyethylene structure include (a) an ethylene oxide adduct of a higher aliphatic alcohol, (b) an ethylene oxide adduct of an alkylphenol, (c) an ethylene oxide adduct of an alkylphenol-formaldehyde resin, (d) an ethylene oxide adduct of a higher fatty acid, (e) an ethylene oxide adduct of an aliphatic amide, (f) an ethylene oxide adduct of an alkanesulfonamide, (g) an ethylene oxide adduct of an amine, (h) an ethylene oxide adduct of a propylene oxide polymer, and (i) an ethylene oxide adduct of phosphoric acid. These nonionic surface active agents preferably have an HLB of from 11 to 14. Those having an HLB of less than 11 produce smaller effects due to low water solubility. Those having an HLB exceeding 14 assume water repellency, tending to cause film defects.

As compared with anionic or cationic surface active agents, the nonionic surface active agents is advantageous in that adhesion to a toner is improved.

Among the above-mentioned surface active agents (a) to (i), preferred is an ethylene oxide adduct of an alkylphenol (b). In ethylene oxide adduct of an alkylphenol (b), the alkyl moiety preferably contains from 3 to 20 carbon atoms, particularly from 5 to 14; the number of added moles of ethylene oxide is preferably from 3 to 20, particularly from 5 to 14; and the ethylene oxide is preferably at the para-positioned of the alkylphenol. Examples of (b) are shown below.

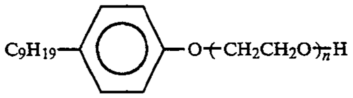
(1)

n : 7-11 HLB : 11.7-13.8

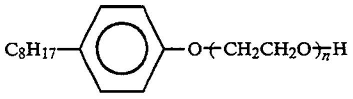
(2)

n : 6-10 HLB : 11.3-13.1

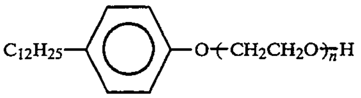
(3)

n : 9-12 HLB : 12.0-13.7

Specific examples of (b) are Nonipol 70, 85, 95, 100, and 110, Octapol 60, 80, and 100, Dodecapol 90 and 120 (all produced by Sanyo Chemical Industries, Ltd.) and EMALEX/NP 8.5 (produced by Nippon Emulsion K.K.).

The above-mentioned nonionic surface active agent having a polyoxyethylene structure is preferably used in an amount of from 0.1 to 20% by weight based on the image-receiving layer.

In order that the image-receiving layer may have a surface resistivity of from $1\times10^9$ to $1\times10^{13}$ Ω in an environment at 30 to 90% RH, the image-receiving layer generally has a thickness of from 0.01 to 1 μm, preferably 0.05 to 0.5 μm, more preferably 0.1 to 0.5 μm.

The image-receiving layer preferably contains a matting agent, such as resins having lubricating properties, inorganic fine particles, and plastic beads. A matting agent, particularly a resin with lubricating properties, improves slip properties and produces satisfactory effects on abrasion resistance and scratch resistance.

The resins having lubricating properties which can be used as a matting agent include polyolefins, such as polyethylene, and fluorine resins, such as polyvinyl fluoride, polyvinylidene fluoride, and polytetrafluoroethylene (Teflon). Specific examples of such resins are low-molecular polyolefin waxes (e.g., polyethylene wax), high-density polyethylene wax, paraffin wax, microcrystalline wax, and a polytetrafluoroethylene (PTFE) dispersion, with low-molecular polyolefin waxes generally having a molecular weight of 1000 to 5000 being preferred. These resins preferably have a coefficient of static friction of not more than 0.4 and/or a relatively low softening point, for example, a Vicat softening point of less than 140° C., particularly between 100° C. and 140° C. It is preferable that these resins have a flat shape in the image-receiving layer. A matting agent of resin previously having a flat shape may be used, or a non-flat matting agent of resin having a relatively low softening point, preferably the above-specified Vicat point, may be used. In the latter case, the matting agent of resin is afterward flattened by heat drying of the image-receiving layer or by pressing under heat. In this case, however, note that the matting agent of resin preferably protrudes on the surface of the image-receiving layer to provide unevenness even after the flattening treatment.

Suitable inorganic fine particles as a matting agent include $SiO_2$, $Al_2O_3$, talc, and kaolin. Suitable plastic beads as a matting agent include powder of crosslinked polymethyl methacrylate (hereinafter abbreviated as PMMA), polycarbonate, polyethylene terephthalate or polystyrene.

It is preferable that the matting agent should have an average particle size of from more than 0.1 to not more than 10 $\mu$m, and particularly from 1 to 5 $\mu$m. When inorganic fine particles are used as a matting agent, the average particle size thereof is preferably from 1 to 10 $\mu$m. If the matting agent is greater than 10 $\mu$m, it is apt to fall off the image-receiving layer, and the film becomes less resistant to abrasion and less transparent. The matting agent is preferably added in an amount of from 0.1 to 10% by weight, more preferably from 0.5 to 5% by weight, and most preferably from 0.5 to 3% by weight, based on the binder resin.

It is essential for the above-described image-receiving layer to have a surface resistance of from $1\times10^9$ to $1\times10^{13}$ $\Omega$ as measured at 25° C. and 65% RH. If the surface, resistivity is less than $1\times10^9$ $\Omega$, a sufficient amount of a toner cannot be transferred to the image-receiving layer only to provide a toner image of low density. If it exceeds $1\times10^{13}$ $\Omega$, the electrophotographic film is easily electrified during handling to attract the dust and is apt to cause missfeeding, such as double feeding, on copying. Where blurring of an image tends to occur at a low humidity, the surface resistivity is preferably set between $1\times10^9$ to $1.5\times10^{10}$ $\Omega$.

If desired, the image-receiving layer may further contain known additives, such as colorants, ultraviolet absorbents, crosslinking agents, and antioxidants, as far as the characteristics as aimed at are not impaired.

An image-receiving layer can be formed by coating a transparent substrate with a coating composition prepared by dispersing or dissolving the above-described components, such as a binder resin, a resistivity control agent, and a matting agent, in water or an organic solvent, followed by heat drying. Coating can be carried out by means of any known coating apparatus, e.g., an air doctor coater, a blade coater, a rod coater, a knife coater, a squeeze coater, a reverse roll coater, a bar coater, and so on.

While the electrophotographic film of the present invention has been explained with reference to a layer structure composed of a transparent substrate and an image-receiving layer, it is possible to provide a conductive subbing layer between the transparent substrate and the image-receiving layer where a desired surface resistivity cannot be obtained by using the above-mentioned resistivity control agent. It is preferable to provide a conductive subbing layer for effectively obtaining the effects of the present invention.

The conductive subbing layer which may be provided is a layer comprising a binder resin having dispersed therein fine particles of a conductive metal oxide.

Specific examples of the conductive metal oxide are ZnO, TiO, $SnO_2$, $Al_2O_3$, $In_2O_3$, $SiO_2$, MgO, BaO, and $MoO_3$. These metal oxides may be used either individually or in the form of a compound oxide thereof. The metal oxide preferably contains a different element as a dopant. For example, ZnO doped with Al, In, etc.; TiO doped with Nb, Ta, etc.; and $SnO_2$ doped with Sb, Nb, a halogen element, etc. are preferred. Among them, Sb-doped $SnO_2$ is especially preferred.

The metal oxide fine particles to be used in the subbing layer preferably have a particle size of not more than 0.2 $\mu$m.

The binder resin which can be used in the conductive subbing layer includes water-soluble polymers, such as polyvinyl alcohol, polyacrylic acid, polyacrylamide, polyhydroxyethyl acrylate, polyvinylpyrrolidone, water-soluble polyester, water-soluble polyurethane, water-soluble nylon, water-soluble epoxy resins, gelatin, hydroxyethyl cellulose, hydroxypropyl cellulose, carboxymethyl cellulose, and derivatives thereof; water-dispersible resins, such as water-dispersible acrylic resins and water-dispersible polyester; emulsions, such as acrylic resin emulsions, polyvinyl acetate emulsions, and SBR (styrene-butadiene rubber) emulsions; and organic solvent-soluble resins, such as acrylic resins and polyester resins. Of them, water-soluble polymers, water-dispersible resins and emulsions are preferred. These polymers preferably contain the above-mentioned nonionic surface active agent. The polymers may further contain a crosslinking agent or a surface active agent other than the above-mentioned nonionic surface active agent.

The conductive subbing layer can be formed in the same manner as for the image-receiving layer.

Image formation on the electrophotographic transfer film according to the present invention can be carried out through the following procedure:

1) A latent image formed on a photoreceptor is developed with a toner.
2) The toner image is transferred to the electrophotographic transfer film of the present invention.
3) The transferred toner image is fixed on the film by heating under pressure.

The present invention will now be illustrated in greater detail with reference to Examples, but it should be understood that the present invention should not be construed as being limited thereto. In the Examples, all the parts are by weight unless otherwise indicated.

EXAMPLE 1

A 100 $\mu$m thick polyethylene terephthalate film, having been biaxially stretched and heat-set, was subjected to a corona discharge treatment to prepare a substrate. A coating composition having the following formulation was applied on .each side of the substrate with a bar coater #2.4 at a coating speed of 105 m/min and dried at 120° C. for 1 minute to form a conductive subbing layer having a thickness of 0.15 $\mu$m.

| Formulation of Conductive Subbing Layer: | |
|---|---|
| Water-dispersible acrylic resin ("Jurymer ET-410" produced by Nippon Junyaku K.K.) | 1.42 part |
| Stannic oxide ("SN-88" produced by Ishihara Sangyo Kaisha, Ltd.; average particle size: 88 nm) | 2.25 parts |
| Ethylene oxide-based nonionic surface active agent having the formula shown below ("EMALEX/NP 8.5" produced by Nippon Emulsion K.K.; HLB: 12.6) | 0.16 part |

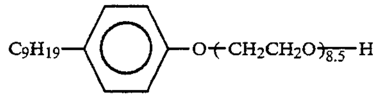

-continued

| Formulation of Conductive Subbing Layer: | |
|---|---|
| Pure water | 96.17 parts |

A coating composition having the following formulation was then applied on each conductive subbing layer with a bar coater #2.4 at a coating speed of 105 m/min and dried at 120° C. for 1 minute to form an image-receiving layer having a thickness of 0.10 $\mu$m on each side. There was thus obtained an electrophotographic transfer film having a conductive subbing layer and an image-receiving layer on both sides thereof.

| Formulation of Image-Receiving Layer: | |
|---|---|
| Water-dispersible glycidyl acrylate-modified polyester ("A515G" produced by Takamatsu Yushi K.K.; Tg: 75° C.; polar group: sodium sulfonate; polar group concentration: 1.6 wt %) | 1.79 parts |
| Ethylene oxide-based nonionic surface active agent "EMALEX/NP 8.5" (HLB: 12.6) | 0.11 part |
| Low-molecular weight polyolefin matting agent ("Chemipearl W100" produced by Mitsui Petrochemical Industries, Ltd.; average particle diameter: 3 $\mu$m; softening point: 128° C.) | 0.07 part |
| Crosslinked PMMA matting agent ("MR-2G-20-5" produced by Soken Kagaku K.K.; average particle diameter: 3 $\mu$m) | 0.04 part |
| Pure water | 97.99 parts |

EXAMPLE 2

An electrophotographic transfer film was prepared in the same manner as in Example 1, except for replacing EMALEX/NP 8.5 with an ethylene oxide-based nonionic surface active agent having the formula shown below ("Octapol 80" produced by Sanyo Chemical Industries, Ltd.; HLB: 12.4):

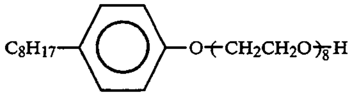

EXAMPLE 3

An electrophotographic transfer film was prepared in the same manner as in Example 1, except for replacing EMALEX/NP 8.5 with an ethylene oxide-based nonionic surface active agent having the formula shown below ("Dodecapol 90" produced by Sanyo Chemical Industries, Ltd.;HLB: 12.0):

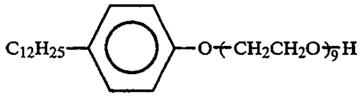

COMPARATIVE EXAMPLE 1

An electrophotographic transfer film was prepared in the same manner as in Example 1, except for replacing EMALEX/NP 8.5 with a phosphoric ester surface active agent ("Zerex OM; produced by Miyoshi Oil & Fat Co., Ltd.).

COMPARATIVE EXAMPLE 2

An electrophotographic transfer film was prepared in the same manner as in Example 1, except for replacing EMALEX/NP. 8.5 with a sodium alkyldiphenyl ether disulfonate ("Sandet BL" produced by Sanyo Chemical Industries, Ltd.).

Each of the electrophotographic transfer films prepared in Examples 1 to 3 and Comparative Examples 1 to 2 was evaluated according to the following test methods. The results obtained are shown in Table 1 below.

1) Haze (%):

Measured with a haze meter ("HGP-2DP" manufactured by Suga Shikenki K.K.).

2) Toner Adhesion:

Copies were taken on an electrophotographic copying machine ("Model 5017" manufactured by Fuji Xerox Co., Ltd.). A solid image area was subjected to a an adhesive tape "Cello-tape" (produced by Nichiban Co., Ltd.) test. The optical density of the toner image before and after peeling of the adhesive tape was measured with an optical densitometer ("X-Rite 310TR" manufactured by X-Rite Co., Ltd.) to obtain a toner adhesion (%) according to formula:

$$\frac{\text{Optical Density After Peeling}}{\text{Optical Density Before Peeling}} \times 100$$

3) Resistance to Embossing:

Photocopies were taken on an electrophotographic copying machine ("Model 5026" manufactured by Fuji Xerox Co., Ltd.), and the surface unevenness of the copies was observed with the naked eye. The emboss resistance of the film was rated "good" (no unevenness was observed) or "bad" (the film had uneven surface, i.e., reduced smoothness).

4) Toner Transfer Properties (Optical Density):

Photocopies were taken on an electrophotographic copying machine "Model 5026". The average optical density of the resulting 10 copies was measured with an optical densitometer, X-Rite 310TR, to evaluate toner transfer properties.

5) Film Feeding Properties (Rate of Double Feeding; %):

Photocopies were taken on an electrophotographic copying machine ("VIVACE 120" manufactured by Fuji Xerox Co., Ltd.). The film feeding properties were evaluated in terms of the frequency of double feeding per 100 copies.

6) Surface Resistivity ($\Omega$):

Measured in accordance with ASTM D257-78 at 25° C. and 65% RH or at 20° C. and 30% RH.

TABLE 1

| | Example 1 | Example 2 | Example 3 | Compar. Example 1 | Compar. Example 2 |
|---|---|---|---|---|---|
| Haze (%) | 3.4 | 3.8 | 3.6 | 4.2 | 3.9 |
| Toner Adhesion (%) | 92 | 86 | 90 | 25 | 33 |
| Resistance to | good | good | good | good | good |

TABLE 1-continued

| | Example 1 | Example 2 | Example 3 | Compar. Example 1 | Compar. Example 2 |
|---|---|---|---|---|---|
| Embossing Toner Transfer Properties (optical density) | 1.24 | 1.23 | 1.20 | 0.95 | 0.80 |
| Rate of Double Feeding (%) | 0 | 0 | 0 | 0 | 0 |
| Surface Resistivity (Ω): | | | | | |
| 25° C., 65% RH | $1.0 \times 10^{10}$ | $1.0 \times 10^{10}$ | $1.0 \times 10^{10}$ | $3.0 \times 10^{9}$ | $2.0 \times 10^{9}$ |
| 20° C., 30% RH | $9.0 \times 10^{9}$ | $1.1 \times 10^{10}$ | $1.0 \times 10^{10}$ | $1.1 \times 10^{10}$ | $1.0 \times 10^{10}$ |

EXAMPLE 4

A 100 μm thick polyethylene terephthalate film, having been biaxially stretched and heat-set, was subjected to a corona discharge treatment to prepare a substrate.

A coating composition having the following formulation (expressed on a solid basis or nonvolatile content basis, hereinafter the same) for an image-receiving layer was prepared.

| Formulation of Image-Receiving Layer: | |
|---|---|
| Water-dispersible polyester resin ("WR-905" produced by The Nippon Synthetic Chemical Industry Co., Ltd.; Tg: 70° C.; polar group: sodium sulfonate) | 1.44 parts |
| Stannic oxide "SN-88" (average particle size: 88 nm) | 2.28 parts |
| Ethylene oxide-based nonionic surface active agent "EMALEX/NP 8.5" (HLB: 12.6) | 0.17 part |
| Low-molecular polyethylene wax "Chemipearl W100" (average particle size: 3 μm; softening point: 128° C.)) | 0.07 part |
| Crosslinked PMMA matting agent "MR-2G-20-5" (average particle size: 3 μm) | 0.04 part |
| Pure water | 96.00 parts |

The coating composition was applied on the substrate by means of a bar coater #2.4 at a coating speed of 105 m/min and dried at 120° C. for 1 min to form an image-receiving layer having a thickness of 0.15 μm. The same image-receiving layer was also formed on the reverse side in the same manner to prepare an electrophotographic transfer film having an image-receiving layer on both sides thereof.

EXAMPLE 5

An electrophotographic transfer film was prepared in the same manner as in Example 4, except for replacing stannic oxide "SN-88" (average particle size: 88 nm) with stannic oxide "SN-38" produced by Ishihara Sangyo Kaisha, Ltd. (average particle size: 38 nm).

COMPARATIVE EXAMPLE 3

An electrophotographic transfer film was prepared in the same manner as in Example 4, except for using a coating composition having the following formulation for an image-receiving layer, in which a sodium sulfate type surface active agent was used in place of stannic oxide "SN-88" and no ethylene oxide-based nonionic surface active agent was used.

| Formulation of Image-Receiving Layer: | |
|---|---|
| Water-dispersible polyester resin "WR-905" (Tg: 70° C.; polar group: sodium sulfonate) | 1.79 parts |
| Sodium sulfate type surface active agent ("Emal O" produced by Kao Corp.) | 0.11 part |
| Low-molecular polyethylene wax "Chemipearl W100" (average particle size: 3 μm; softening point: 128° C.)) | 0.07 part |
| Crosslinked PMMA matting agent "MR-2G-20-5" (average particle size: 3 μm) | 0.04 part |
| Pure water | 97.99 parts |

COMPARATIVE EXAMPLE 4

An electrophotographic transfer film was prepared in the same manner as in Comparative Example 3, except for replacing the sodium sulfate type surface active agent with an anionic surface active agent "Demol N" produced by Kao Corp.

COMPARATIVE EXAMPLE 5

An electrophotographic transfer film was prepared in the same manner as in Example 4, except for using the following composition for forming an image-receiving layer.

| Formulation of Image-Receiving Layer: | |
|---|---|
| Water-dispersible acrylic resin ("ET-410" produced by Nippon Junyaku K.K.; Tg: 44° C.) | 1.44 parts |
| Stannic oxide "SN-88" (average particle size: 88 nm) | 2.28 parts |
| Pure water | 96.28 parts |

Each of the films prepared in Examples 4 to 5 and Comparative Examples 3 to 5 was evaluated in the same manner as in the foregoing Examples. Scratch resistance of the film was also evaluated according to the following test method. The results obtained are shown in Table 2 below.

7) Scratch Resistance:

Photocopies obtained on an electrophotographic copying machine "Model 5026", and scratches of the film surface were observed with the naked eye. The scratch resistance was rated "good" (scratches were substantially imperceptible) or "bad" (many perceptible scratches were observed).

TABLE 2

| | Example 4 | Example 5 | Compar. Example 3 | Compar. Example 4 | Compar. Example 5 |
|---|---|---|---|---|---|
| Haze (%) | 3.3 | 2.0 | 2.5 | 3.3 | 8.2 |
| Toner Adhesion (%) | 92 | 92 | 35 | 40 | 28 |
| Resistance to Embossing | good | good | good | good | bad |
| Toner Transfer Properties (optical density) | 1.20 | 1.22 | 0.21 | 0.15 | 0.90 |
| Rate of Double Feeding (%) | 0 | 0 | 5 | 6 | 22 |
| Surface Resistivity (Ω): | | | | | |
| 25° C., 65% RH | $1.1 \times 10^{10}$ | $1.0 \times 10^{10}$ | $2.3 \times 10^{10}$ | $2.2 \times 10^{10}$ | $1.3 \times 10^{10}$ |
| 20° C., 30% RH | $1.1 \times 10^{10}$ | $1.1 \times 10^{10}$ | $4.0 \times 10^{14}$ | $3.9 \times 10^{14}$ | $1.4 \times 10^{10}$ |
| Scratch Resistance | Good | Good | Good | Good | Bad |

According to one embodiment of the present invention, in which the image-receiving layer contains a binder resin and a nonionic surface active agent, the electrophotographic transfer film has improved fixing properties (toner adhesion) and improved resistance to embossing. It is considered that the nonionic surface active agent acts to impart lubricating properties, rather than increased stickiness, to the surface of the image-receiving layer and, in addition, to impart plastic properties to the image-receiving layer.

The electrophotographic transfer film according to this embodiment maintains the above-described excellent characteristics even under various environmental conditions, especially at a high or low humidity, or when used or stored for a long period of time. Additionally, the electrophotographic transfer film is also excellent in toner transfer and fixing properties and film feeding properties.

According to another embodiment of the present invention, in which the image-receiving layer contains a binder resin and conductive metal oxide fine particles having a particle size of not greater than 0.1 μm, the electrophotographic transfer film exhibits stable surface resistivity. The disadvantages often arising from a conductive layer comprising a binder resin containing metal oxide fine particles, such as poor film feeding properties, poor toner fixing properties, increase in haze, and reduction in scratch resistance, can be eliminated by controlling the particle size of the metal oxide to 0.1 μm or smaller, and preferably by using a matting agent having lubricating properties. Such manipulations make it feasible to incorporate metal oxide fine particles into an image-receiving layer. As a result, the surface resistivity can be stably maintained at a prescribed level even under a high humidity condition while eliminating the above-mentioned disadvantages. That is, this embodiment provides an electrophotographic transfer film having a single image-receiving layer on a substrate and exhibiting excellent characteristics conventionally obtained by a double-layer structure (a conductive layer and an image-receiving layer), i.e., not only stabilized surface resistivity but other various properties.

The electrophotographic transfer film according to the present invention is less liable to variation of surface resistivity with environmental changes, particularly in humidity, exhibits excellent transfer properties to provide a high density toner image, which hardly generate frictional electrification during processing or handling even in a low humidity condition, and exhibits excellent film feeding properties and scratch resistance.

Where, in particular, a water-dispersible polymer is used as a binder resin of a image-receiving layer, an image-receiving layer exhibiting desired effects can be formed without using an organic solvent. In this regard, the present invention is advantageous for prevention of environmental pollution.

While the invention has been described in detail and with reference to specific examples thereof, it will be apparent to one skilled in the art that various changes and modifications can be made therein without departing from the spirit and scope thereof.

What is claimed is:

1. An electrophotographic transfer film comprising a transparent substrate having formed on at least one side thereof an image-receiving layer containing a binder resin and at least one resistivity control agent selected from (a) conductive metal oxide fine particles having an average particle size of not greater than 0.1 μm and (b) an nonionic surface active agent, said image-receiving layer having a surface resistivity of from $1 \times 10^9$ to $1 \times 10^{13}$ Ω at 25° C. and 65% RH.

2. The electrophotographic film as claimed in claim 1, wherein said image-receiving layer further contains a matting agent.

3. The electrophotographic transfer film as claimed in claim 1, wherein said binder resin has a glass transition temperature of not less than 60° C.

4. The electrophotographic transfer film as claimed in claim 1, wherein said nonionic surface active agent is a nonionic surface active agent having a polyoxyethylene structure.

5. The electrophotographic transfer film as claimed in claim 1, wherein said nonionic surface active agent has an hydophilic-lipophilic balance of from 11 to 14.

6. The electrophotographic transfer film as claimed in claim 1, wherein said binder resin is a polyester resin.

7. The electrophotographic transfer film as claimed in claim 1, wherein said film further comprises a conductive subbing layer containing a nonionic surface active agent, provided between said transparent substrate and said image-receiving layer.

8. The electrophotographic transfer film as claimed in claim 1, wherein said nonionic surface active agent is an ethylene oxide adduct of an alkylphenol.

9. The electrophotographic transfer film as claimed in claim 1, wherein said binder resin is a polyester resin having a glycidyl group in the molecular structure thereof.

10. The electrophotographic transfer film as claimed in claim 1, wherein said binder resin is a water-dispersible polymer.

11. The electrophotographic transfer film as claimed in claim 2, wherein said matting agent has an average particle size of from 1 to 5 μm.

12. The electrophotographic transfer film as claimed in claim 2, wherein said matting agent is a resin having a coefficient of static friction of not more than 0.4.

13. The electrophotographic transfer film as claimed in claim 2, wherein said matting agent is a polyolefin.

14. The electrophotographic transfer film as claimed in claim 2, wherein said matting agent has an average particle size of from more than 0.1 to not more than 10 μm.

15. The electrophotographic transfer film as claimed in claim 1, wherein said image-receiving layer has a thickness of from 0.01 to 1 μm.

16. The electrophotographic transfer film as claimed in claim 1, wherein said transparent substrate comprises polyethylene terephthalate.

17. The electrophotographic transfer film as claimed in claim 1, wherein said conductive metal oxide fine particles are Sb-doped stannous oxide ($SnO_2$) fine particles.

* * * * *